United States Patent [19]

McGivern

[11] 4,054,520

[45] Oct. 18, 1977

[54] SCUM REMOVAL SYSTEM FOR A SEWAGE SETTLING TANK

[75] Inventor: Robert F. McGivern, Columbus, Ohio

[73] Assignee: Sybron Corporation, Rochester, N.Y.

[21] Appl. No.: 654,560

[22] Filed: Feb. 2, 1976

[51] Int. Cl.[2] .............................................. B01D 21/02

[52] U.S. Cl. .................................... 210/122; 210/138; 210/221 R; 210/242 S; 210/525; 210/527; 210/540

[58] Field of Search ............ 210/242 S, 242 R, 221 R, 210/525, 538, 519, 540, 520, DIG. 25, 103, 104, 105, 121, 523, 122, 527, 138, 359

[56] References Cited

U.S. PATENT DOCUMENTS

| | | | |
|---|---|---|---|
| 3,437,212 | 4/1969 | Thorn et al. | 210/525 |
| 3,923,661 | 12/1975 | Crisafulli | 210/242 S |

FOREIGN PATENT DOCUMENTS

| | | | |
|---|---|---|---|
| 430,854 | 4/1935 | United Kingdom | 210/523 |

*Primary Examiner*—Bernard Nozick
*Assistant Examiner*—Frank Sever
*Attorney, Agent, or Firm*—Theodore B. Roessel; Roger Aceto

[57] ABSTRACT

A scum removal system for sewage settling tanks and the like employs a floating skimmer system which is lowered onto the surface of the liquid at one end of the tank and then moved toward the opposite end where floating materials collected by the skimmer are passed into a scum trough. At the trough end of the tank, the skimmer is raised from the surface of the liquid and returned to the first end while being held above the liquid surface. Continuous flow into the scum trough is prevented by a floating beach hinged to the scum trough. The beach is submerged as the skimmer approaches so that flow over the submerged beach carries the collected materials into the scum trough. Flow over the submerged beach is controlled by the depth as well as the length of time that the beach is held beneath the surface.

5 Claims, 8 Drawing Figures

44
70
43
68a
68
66
66a
38
42
43
24
18

SCUM REMOVAL SYSTEM FOR A SEWAGE SETTLING TANK

BACKGROUND OF THE INVENTION

The present invention relates generally to a scum removal system for removing floating materials such as oil, scum, floating bodies and the like from the surface of a sewage settling tank.

In scum removal systems of the prior art, apparatus such as a wiper of one sort or another is moved across the surface of the liquid to push the floating materials toward a scum trough located at one end of the settling tank. The upper edge of the trough is located above the level of the liquid in the tank and a structure known in the art as a beach is inclined downward from the top of the trough into the liquid. With this arrangement, the wiper scrapes the floating material up the inclined beach and over into the trough. For example, British Patent Specification No. 390,989 illustrates a skimmer which is mounted to a floating body and a typical inclined beach.

According to the invention, the skimmer itself floats on the liquid in the settling tank and is urged along by a floating carriage. Further, the upper edge of the scum trough is below the average level of liquid in the tank. A floating beach fixed to the upper edge of the trough rises above the liquid level to prevent liquid from flowing over into the trough. As the skimmer approaches, the beach is submerged to permit flow over the beach and into the trough. This fklow carries with it the floatable materials which have been collected by the skimmer. Flow over the beach is controlled by depth to which the beach is submerged and the length of time the beach remains submerged. The skimmer itself is stopped short of contact with the beach and is lifted from the surface of the liquid for movement back to the opposite end of the tank where the skimmer is again lowered onto the liquid. Both the lifting and lowering of the skimmer is accomplished by a system of inclined ramps, stops and nests.

DESCRIPTION OF THE PREFERRED EMBODIMENTS

Figure 1:
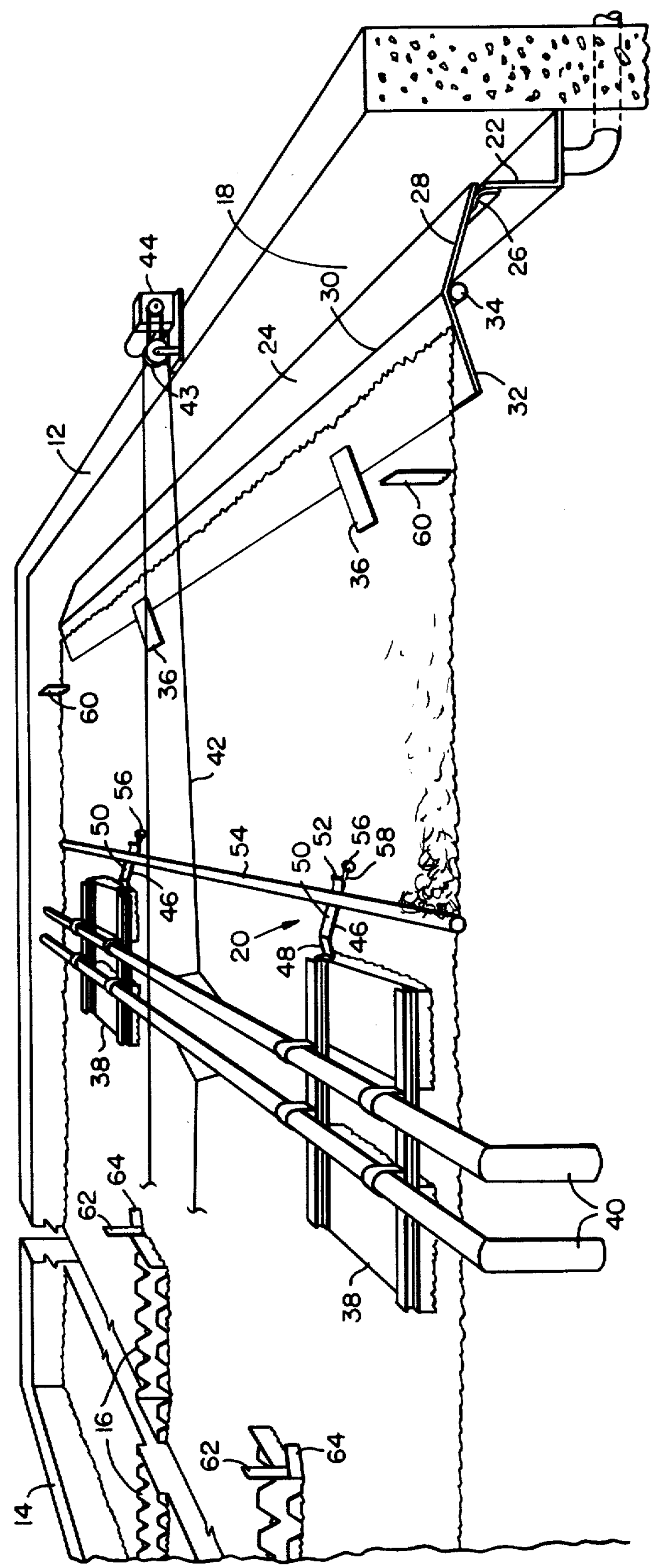
FIG. 1 is a sectional view in perspective showing the skimmer and floating beach of the present invention in use.

Referring to the drawings, FIG. 1 shows a sewage settling tank, the construction of which is well known in the art. For purposes of the present invention it is sufficient merely to say that the tank has an inlet end 12 where liquids are introduced into the tank through subsurface inlet (not shown). The flow liquid is from end 12 to the effluent end 14 at the opposite end of the tank. As liquid travels from the inlet end to the effluent end, solids settle out so that a clarified liquid flows over weirs 16. The settled solids and sludge eventually are removed from the bottom of the tank by any conventional means.

Any oils, scums and other floating materials which rise to the surface of the liquid in the settling tank are removed through a scum trough 18 located acorss the inlet end of the tank. These floating materials are collected and pushed towards the scum trough by the skimming apparatus of the present invention generally indicated at 20. The scum trough in accordance with the present invention has its upper edge 22 located below the level of liquid in the tank. Fixed to this edge 22 is a floating beach 24 which prevents liquid from continuously flowing over the upper edge and into the trough.

Floating beach 24 is an elongated piece connected to the upper edge of the scum trough by a hinge and seal 26. The beach is angled in cross section having a first portion 28 inclined upward from the hinge to an edge 30 above the liquid level. At edge 30 the beach is bent so that a portion 32 of the beach extends below the level of liquid in the tank. A float member 34 located beneath the beach along edge 30 maintains this edge above the level of liquid in the tank. Accordingly, edge 32 defines a raised portion which prevents flow of liquid over the beach and into the scum trough. Extensions 36 are fixed at space intervals along beach portion 32 for purposes set out hereinbelow. With the arrangement described thus far, float 34 will maintain the beach floating above the level of liquid in the settling tank as the liquid rises or lowers in response to changes of flow through the tank.

The skimmer apparatus 20 of the present invention is supported by floating carriages 38. While any suitable carriage which travels on rails along the sides of the settling tank or over the tank can be used to support the skimming apparatus, I have shown floating carriages. Such carriages can also support a siphon arrangement 40 for removing sludge at the bottom of the settling tank as is more particularly described in my U.S. Pat. No. 3,333,704. The sludge removal siphons form no part of the present invention and it is sufficient for the present invention merely to say that carriages 38, whether floating or riding on rails are traversed back and forth across the tank by a cable 42, pulley mechanism 43 and reversable motor 44 to be described further hereinbelow.

Extending from each carriage in a direction toward the scum trough are supports 46. The supports are each provided with a saddle portion 48 located above the liquid level and a ramp 50 which extends from the saddle down below the level of liquid in the tank. Each ramp terminates in an upturned end 52. Captured between the ramp and the upturned end and extending across the settling tank transverse of the carriage path of travel is a free floating skimmer boom 54. The boom which is generally cylindrical in cross-section, is urged along by the ramp to collect and move floating materials towards the scum trough.

Completing the structure of the apparatus within the settling tank are rollers 56 carried in front of the floating boom by ramp extensions 58 and a set of spaced upright stops 60 located just forward of the floating beach. A second set of spaced, upright stops 62 are located at the other end of the settling tank adjacent weirs 16, these stops having rest portions 64 above the liquid level.

Figure 8:
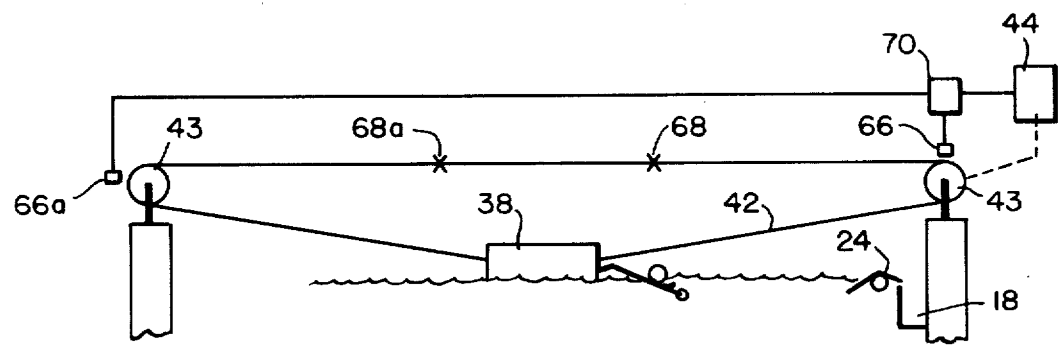
FIG. 8 is a schematic representation of the means for controlling flow over the floating beach.

As set out above, motor power for moving the floating carriages back and forth across the surface of the liquid in the tank is provided by reversable motor 44 connected to the carriages by a cable 42 and pulley mechanism 43. As shown schematically in FIG. 8 reversing the motor is accomplished by tripping a reversing switch 66, **66*a* with dogs 68, 68*a* fixed to the cable. The dogs are adjustable along the cable so that the distance traveled by the carriage before reversing direction can be varied. The actual reversing of motor 44 at either end of the tank can be delayed by a delay timer 70** so that the carriage can be allowed to coast to a complete stop before reversing the direction of travel. Delaying the reversal of the motor can also be used to permit the carriage to linger for a time at one end or another of the settling tank.

Figure 2:
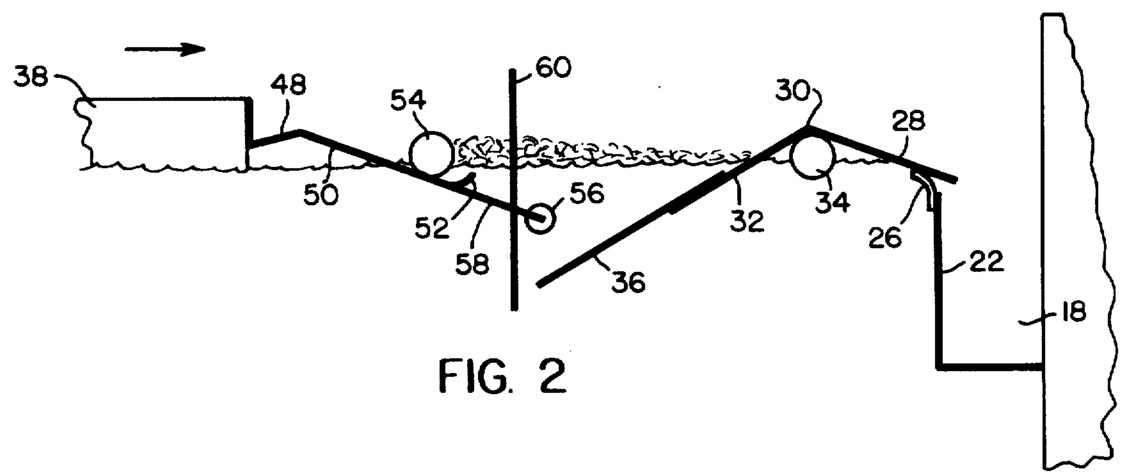
FIGS. 2 and 3 illustrate the operation of the floating beach and means for lifting the floating skimmer.

Describing first the operation of floating beach 24, we shall assume that the cycle starts with skimmer boom 54 floating in the water and motor 44 operating to move floating carriages 38 toward the floating beach. With this arrangement, ramp 50 (as best seen in FIG. 2) urges the free floating boom ahead of the carriage towards the floating beach. The boom sweeps the flaoting material before it so that the materials are accumulated between the beach and the boom. As the skimming apparatus approaches the beach, rollers 56 engage the beach extensions 36. Further movement towards the beach now causes the rollers to ride over extensions 36 (FIG. 3) causing the beach to pivot downward about hinge and seal 26. This depresses the raised portion of the beach (edge 30) below the surface of the liquid in the settling tank. Liquid can now flow over the submerged beach to carry the floating materials previously confined between the boom and the beach into scum trough 18. Thus, the floatable materials are carried over into the scum trough by the flow of the liquid over the beach as opposed to the prior art wherein the floatable materials were scraped up the beach and over into the scum trough.

Since the level of liquid in the settling tank may vary from day to day due to the flow through the tank, the actual liquid level may be above or below the average. Preferably, the scum and floating materials are removed with as little liquid as possible. Accordingly, it is important that the beach be submerged an amount just sufficient to create enough flow to carry the floating materials into the scrum trough. An excessive flow created by submerging the beach too much is to be avoided. Since the level of the liquid in the tank does vary from day to day, it is important to be able to adjust and control the movement of the beach in order to control the flow. This is accomplished in the present invention by increasing and decreasing the amount of engagement between rollers 56 and beach extension 36. While this can be accomplished by increasing or decreasing the length of ramp extensions 58, it is preferred and much simpler to accomplish this adjustment by changing the position of dog **68*a* along cable 43. For example, the dog can be moved along the cable to increase or decrease the distance traveled by the skimming apparatus before the dog comes into contact with reversing switch 66*a*. Moving the dog in one direction will allow the skimming apparatus to travel further to the right as viewed in FIG. 8 before the reversing switch is operated. Moving the dog in the opposite direction will decrease this distance and consequently change the distance that the beach is moved by rollers 56**.

Once the dog is set to depress the beach the proper amount for a given flow through the settling tank, it may be found that motor 44 reverses its direction before all of the floatable materials have been carried over into the scum trough. If this is the case, delay timer 70 can be adjusted to allow the skimming apparartus to dwell at the trough end of the settling tank for a time sufficient to permit substantially all of the floating materials to flow over the beach and into the scum trough. Any delay in the reversing of the motor 44 would also compensate for the inertia of the floating carriages 38 and skimming apparatus 20 and reduce the shock to the system which might result from any rapid change in direction.

Figure 3:
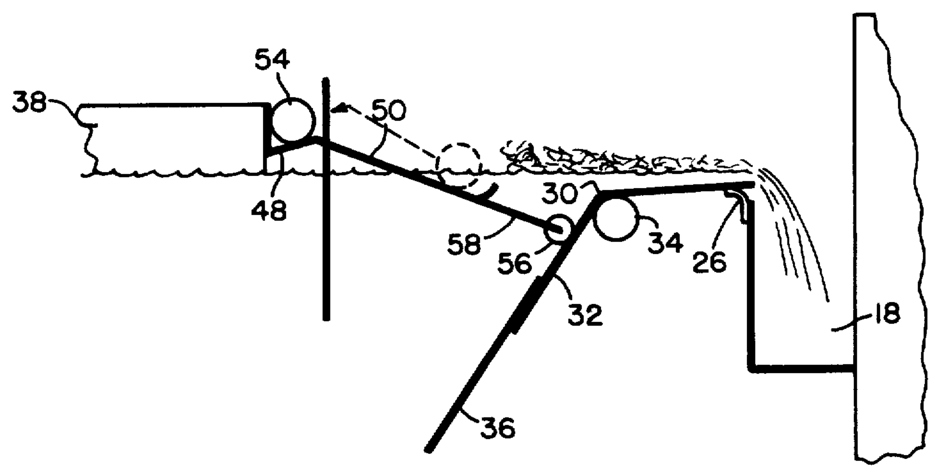

As set out hereinabove, stops 60 are located just forward of the floating beach. These stops play an important function in lifting the free floating boom above the level of the liquid in the settling tank as illustrated in FIGS. 2 and 3. As the floating boom is urged along by ramp 50 in a direction toward the floating beach, the boom comes in contact with skimmer stop 60. This stops the boom, but the ramp continues to move and passes by the stop so that rollers 56 can engage the beach extensions. The continued forward motion of the ramp causes the floating boom to roll up the ramp and come to rest in saddle 48 above the water surface as shown in dotted line in FIG. 3. The direction of carriage 38 is then reversed so that the boom, now captured in saddle 48 above the liquid level, is moved a predetermined distance toward effluent end 14 of the tank.

Since the floating boom is cylindrical in cross section only rolling friction is encountered as boom moves up the ramp and very little power is required to lift the boom into saddle 48. The slope of the boom is relatively critical in that it has been found that too great a slope results in the boom not traveling up the ramp but instead being squeezed between the ramp and stop 60. On the other hand, if the slope is too gentle, the ramp must move a relatively long distance past stop 60 and there is insufficient room between the stop and the floating beach for this purpose. Accordingly, a slope of approximately 15° is preferred with 20° being at the uper limit and 10° the lower.

Figure 4:
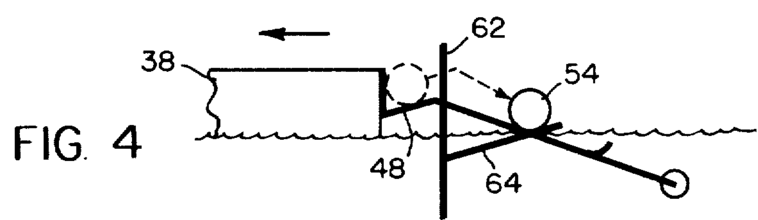
FIGS. 4–7 show the means for lowering the skimmer back onto the surface of the liquid.
Figure 5:
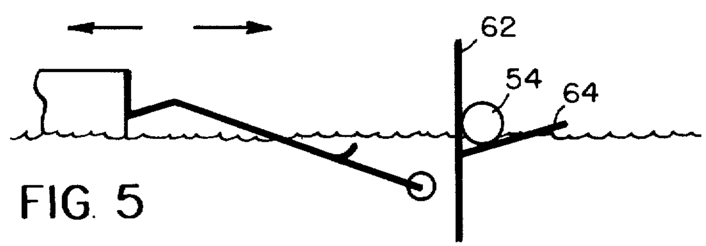
Figure 6:
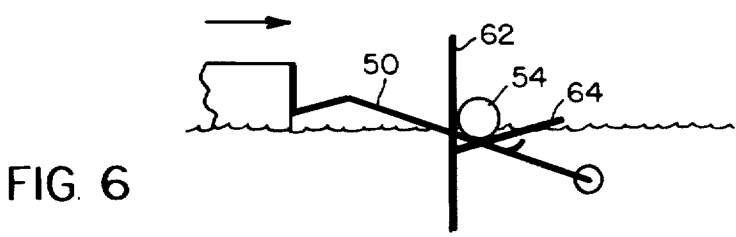
Figure 7:
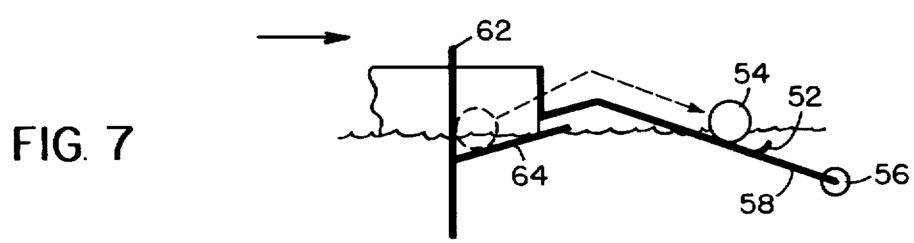

Once carriages 38 and skimming apparatus 20 is at the effluent end of the tank, skimming boom 54 must be lowered back on to the surface of the liquid in the settling tank prior to moving back toward the scum trough 18. The lowering of the boom is accomplished as illustrated in FIGS. 4–7. As shown in FIG. 4, movement toward the effluent end of the tank brings the boom into engagement with stop 62. As the ramp continues to move by stop 62 the boom is moved from the saddle 48 and lowered on to the rest portion 63 of the stop as shown in dotted line in FIG. 4. The boom is retained on the rest as the ramp passes by stop 62 (FIG. 5). When the carriage and ramp reverses direction, due to the tripping of limit switch 66 by dog 68, the ramp will again engage the boom as shown in FIG. 6. Since the ramp rises to an elevation higher than the rest portion, movement of the ramp back past stop 62 lifts the boom from rest 63. Now, as the ramp continues to move back past stop 62, the boom clears the rest and rolls down the ramp to settle back onto the surface of the liquid in the settling tank as shown in dotted line in FIG. 7.

Thus, it should be appreciated that the present invention provides a simple efficient system for removing floating materials from the liquid in a sewage settling tank through the cooperation of a floating beach and a free floating boom together with the relativey effortless means for raising and lowering the boom from the surface of the liquid. The floating beach automatically compensates for changes in the liquid level to prevent continuous flow of liquid over the beach and into a scum trough. The means for submerging the beach and for controlling flow over the beach to remove the floating materials is also simple and easily adjusted. Raising and lowering the floating boom from the surface of the liquid is accomplished in a most simple and efficient manner with the only impediment to the raising of the boom being the rolling friction between the boom and the ramp 50. Lowering the boom back on to the surface of the liquid likewise is accomplished in a simple and efficient manner simply by knocking the boom from its rest to permit the boom to roll down the ramp back into the liquid.

Having thus described the invention, what is claimed as new is:

1. A scum removal system for sewage settling tanks and the like comprising:

a. a scum trough disposed within the settling tank along an end wall thereof, said trough being separated from the liquid in the settling tank by an upright scum trough wall having its upper edge located below the level of liquid in the settling tank;

b. a floating beach extending substantially the full length of said scum trough, said beach being hinge connected to said upper edge and having a portion extending outwardly from said scum trough and into the liquid in the settling tank;

c. a raised portion on said beach intermediate said hinge connection and said outwardly extending portion, said raised portion running generally the full length of said beach parallel to said scum trough and being maintained above the level of liquid in th settling tank by the floating action of said beach to prevent flow into said scum trough;

d. a skimmer assembly operable back and forth across the settling tank for collecting and urging floating scum and the like towards said scum trough;

e. contact means on said skimmer assembly adapted to engaging and traveling a predetermined distance over said outwardly extending portion below the liquid level to pivot said beach downwardly about said hinge connection and submerge said beach and lower said raised portion below the level of liquid in the settling tank so as to permit flow of the floating scums and the like over said beach and into said scum trough; and f. adjustable means for increasing or decreasing said predetermined distance to increase or decrease respectively the depth to which said raised portion is submerged below the level of liquid in the settling tank.

2. A scum removal system as in claim 1 wherein said adjustable means comprises:

a. a reversible motor;

b. a cable and pulley system operatively connecting said motor and skimmer assembly;

c. a dog on said cable; and d. a limit switch which is tripped by said dog for reversing said motor when said skimmer assembly travels said predetermined distance.

3. A scum removal system as in claim 2, wherein said dog is adjustable along said cable to vary the length of travel of said dog prior to tripping said limit switch thereby adjusting said predetermined distance.

4. A scum removal system as in claim 2 including a timer fôr delaying the reversal of said motor after said limit switch is tripped.

5. A scum removal system for sewage settling tanks and the like comprising:

a. a scum trough disposed in the settling tank along one end wall thereof, said trough being separated from liquid in the settling tank by a scum trough wall having its upper edge located below the level of liquid in the settling tank;

b. a beach connected by a hinge to said upper edge and extending outwardly therefrom and into the settling tank, said each having a raised portion;

c. float means pivoting said beach upwardly about said hinge for maintaining said raised portion above the level of liquid in the settling tank so as to prevent the flow of liquid over said beach and into said scum trough;

d. a skimmer assembly operable back and forth across the settling tank for collecting and urging floating scums and the like towards said scum trough;

e. a reversible motor for driving said skimmer assembly back and forth across the settling tank;

f. contact means on said skimmer assembly which functions to engage and submerge said beach such as to lower said raised portion below the level of liquid in the settling tank and permit flow of the floating scums and the like over said beach and into said scum trough when the approach of said skimmer assembly to said beach reaches a predetermined distance; and g. time delay means for delaying the reversal of said motor when said skimmer assembly reaches said predetermined distance so as to maintain said raised portion submerged below the level of liquid in the settling tank for a predetermined time.

* * * * *